_United States Patent_ [19]

Watson

[11] 3,860,614
[45] Jan. 14, 1975

[54] THERMOLYSIS OF STYRENE OXIDE
[75] Inventor: James M. Watson, Big Spring, Tex.
[73] Assignee: Cosden Oil & Chemical Company, Big Spring, Tex.
[22] Filed: Feb. 26, 1973
[21] Appl. No.: 335,456

[52] U.S. Cl............ 260/340.9, 260/599, 260/611 A
[51] Int. Cl........................ C07d 13/00, C07c 45/22
[58] Field of Search.............. 260/599, 340.9, 611 A

[56] References Cited
UNITED STATES PATENTS

| | | | |
|---|---|---|---|
| 2,628,255 | 2/1953 | Sexton et al. | 260/599 |
| 2,704,774 | 3/1955 | Gasson et al. | 260/599 X |
| 3,067,256 | 12/1962 | Fischer et al. | 260/599 X |

FOREIGN PATENTS OR APPLICATIONS

| | | | |
|---|---|---|---|
| 761,040 | 11/1956 | Great Britain | 260/599 |

OTHER PUBLICATIONS
Wagner et al., Synthetic Org. Chem., (1965), 261, 262 and 268.

_Primary Examiner_—Bernard Helfin

[57] ABSTRACT

Styrene oxide is heated under relatively mild temperature conditions to cause thermolysis. Such thermolysis produces substantial quantities of phenylacetaldehyde in the reaction product. Substantially pure phenylacetaldehyde may be recovered from the crude reaction product by distillation procedure, or other separation means, or, if desired, the phenylacetaldehyde may be directly converted in the crude reaction product to produce its acetals. The process of thermolysis of styrene oxide may be conducted with the styrene oxide in liquid phase, in vapor phase, or in solution within an inert solvent. The conditions of reaction are maintained to achieve a mild decomposition, described as thermolysis, as contrasted to a drastic decomposition, a so-called pyrolysis.

22 Claims, No Drawings

THERMOLYSIS OF STYRENE OXIDE

This invention relates to the thermolysis of styrene oxide. An important aspect of the invention relates to such thermolysis of styrene oxide for the production of phenylacetaldehyde.

Styrene oxide is a well known raw material utilized for the production of various chemicals. Likewise, phenylacetaldehyde is a well known chemical compound with a variety of uses. For example, phenylacetaldehyde, as well as dimethylacetal and ethylene glycol acetals thereof, is used in perfume manufacture and formulation. Such utilization is well known to those skilled in the art and will not be further described.

Conventionally, the typical method for the production of phenylacetaldehyde involves several steps. Typically, benzaldehyde and ethyl chloroacetate are subjected to a condensation reaction, after which the product is hydrolyzed. Thereafter, a decarboxylation process step is practiced. This multistep method for the manufacture of phenylacetaldehyde is expensive, and relatively cumbersome. Accordingly, one object of this invention is to provide a novel and improved process for the production of phenylacetaldehyde.

Another object of this invention is to provide a novel process for the production of phenylacetaldehyde from styrene oxide by a relatively straight forward and simple procedure.

A further object of this invention is to provide a rearrangement of styrene oxide, described herein as thermolysis, to produce desirable reaction products. Not only may phenylacetaldehyde be produced, but if desired, the crude reaction product may be treated directly to convert phenylacetaldehyde therein to its ethylene glycol acetal and dimethylacetal without the necessity of prior isolation and purification of the intermediate (phenylacetaldehyde).

Styrene oxide may be heated and under the action of such heat, decomposes. A typical decomposition of styrene oxide when at elevated temperature may be described as the pyrolysis of styrene oxide. The reaction products are principally toluene and carbon monoxide. Of course, with sufficiently drastic conditions, even the toluene decomposes to form reaction products.

In accordance with the present invention, it has been found that styrene oxide rearranges under a relatively mild set of conditions, specifically at a relatively low temperature range, from about 180° C to about 450° C, and preferably from about 250° C to about 375° C, to produce a radically different, but yet desirable reaction. This relatively mild heating of styrene oxide is referred to hereinafter as thermolysis, to distinguish it from the more severe heating, which results in decomposition into undesirable reaction products, the latter being characterized herein as pyrolysis.

According to an important aspect of the invention, phenylacetaldehyde is produced by a process which comprises heating styrene oxide to cause its thermolysis into phenylacetaldehyde. Phenylacetaldehyde may then be recovered from the reaction product mixture to produce substantially pure phenylacetaldehyde.

In one preferred embodiment of this invention, the thermolysis step may be conducted as a batch process. In accordance with another preferred embodiment, such thermolysis may be conducted as a continuous process (flow process).

In one embodiment of the invention, the thermolysis of styrene oxide is conducted while the styrene oxide is in the liquid phase. In yet another embodiment, the thermolysis is conducted while the styrene oxide is in the vapor phase.

In a preferred embodiment of the invention the styrene oxide thermolysis is accomplished while the styrene oxide is in solution with an inert solvent, for example, benzene, toluene, xylene, 2,2,4-trimethylpentane, or the like. In each embodiment of the invention the thermolysis is achieved at relatively low temperatures, within a critical temperature range. The upper limit of such range is on the order of about 450° C. The lower limit of the temperature range is less critical, but to obtain a significant yield in a reasonable amount of time is on the order of about 180° C. Preferably the reaction is conducted between 250° C and 375° C.

Best results to date have been achieved at temperatures within the specifically preferred range of between about 275° C to 350° C for liquid phase reaction and from about 325° C to about 375° C for vapor phase reaction.

While temperature ranges are believed critical, the numerical expression of such ranges is somewhat difficult in view of the variations of temperature with contact time. A wide variety of contact times may be utilized at appropriate temperatures. As a practical matter, a temperature that at a given contact time causes the styrene oxide reaction to yield a commercially practical quantity of phenylacetaldehyde, for example on the order of about 30 percent by weight, is considered to lie well within the critical range. It should be noted that at higher temperatures, outside of the true critical range, such percentages cannot be obtained since the reaction proceeds in an entirely different manner producing, for example, substantial quantities of toluene and carbon monoxide. This undesirable higher temperature reaction takes over when the upper critical temperature has been exceeded. A simple and quick test procedure, for example conventional chromatographic analysis, makes it easy to determine whether or not reaction is proceeding in the temperature range for thermolysis by determining if a substantial quantity of phenylacetaldehyde, e.g., about 30 percent by weight or more, is being obtained in the reaction product. This method of expressing the critical limits of practice is convenient and relatively inexpensive.

Turning to the description of the present invention in more detail, styrene oxide may be heated either batchwise or in a continuous flow process to cause its thermolysis. While substantially pure styrene oxide may be so reacted, it is often preferable that the styrene oxide be dissolved in an inert solvent such as toluene, benzene, xylenes, ethylbenzene, heptane, octane and other analogous hydrocarbons, or other inert solvents to accomplish the thermolysis step. In the case of the solution type of reaction, wherein the styrene oxide is dissolved in an inert solvent, a relatively minor amount of styrene oxide is preferably dissolved within a relatively major amount of inert solvent.

Minor amount as used herein is defined hereby as less than about 0.5 weight fraction while major amount is defined as more than about 0.5 weight fraction. Note that the solution type of reaction may be conducted either in liquid or vapor phase.

When the thermolysis of styrene oxide is conducted in accordance with the solution aspect of the present invention, preferably the styrene oxide is present in a quantity of about 2–20 percent expressed as percent of styrene oxide by weight in the total solution of styrene oxide in inert solvent and the reaction temperature is preferably maintained at between about 250° C and 375° C.

When thermolysis of styrene oxide is conducted in solution, the reaction product is subjected to a process step to separate the phenylacetaldehyde produced from the crude reaction product. Such separation may be conducted by a variety of means, exemplary being distillation, the preferred means for such separation. It is preferred that the thermolysis reaction be conducted under conditions that result in substantially full conversion of styrene oxide, but in some instances this may not prove feasible. Therefore, it is pointed out that in those instances where styrene oxide raw material remains in deleterious quantity in the reaction product to be purified, the reaction product should be treated before distillation to eliminate this styrene oxide since the boiling point of styrene oxide and phenylacetaldehyde are very similar (about 1° C). The styrene oxide may be converted to phenylethylene glycol by washing the reaction mixture with dilute mineral acid. The glycol then is simply separated along with the aqueous phase in a conventional liquid-liquid separation. The organic (or solvent) phase contains the phenylacetaldehyde, which then is recovered by conventional distillation procedure. When mineral acid is required, or desired for conversion of residual styrene oxide, it is preferred that it be utilized in quantity of about 1 to 3 parts by volume of aqueous acid to 10 parts by volume of the reaction product mixture, including inert solvent. Various strengths of aqueous acid may be utilized, but it is preferred that the concentration be from about 1 to 20 weight percent by weight (for example 1–20 percent by weight $H_2SO_4$, HCl, $HNO_3$, or other mineral acid) For most purposes, it is believed that the lower end of the range, about 1 to 4 percent by weight acid, is best. Room temperature has been found quite satisfactory for the acid treatment. During the contact of the crude reaction mixture with acid, the contact time varies considerably with the strength of the acid to achieve a substantially complete conversion of the residual styrene oxide. For example, with contact at room temperature, I have found that with from about 1 to about 20 percent sulfuric acid the reaction time varies from about 1 hour, for the lower concentration acid, to about 5 minutes, with the higher concentration acid. The contact is best effected by stirring or otherwise agitating the aqueous acid and the crude product mixture, but any means that produces an intimate contact for the required period of time may be utilized.

As previously indicated, the thermolysis of relatively pure styrene oxide, as well as a solution of styrene oxide in inert solvent may be accomplished in vapor phase. In accordance with the vapor phase aspect of the invention, the time of exposure for reaction is preferably made relatively short at somewhat higher temperatures than the liquid phase reaction, preferably at about 325° C to about 375° C. The vapor phase reaction appears to have the advantage of more expeditious handling.

In general, whether in liquid or vapor phase, practice of the invention at higher temperatures within the critical range results in accelerated reaction time.

In many instances it may be desired to obtain an acetal instead of phenylacetaldehyde. This may be accomplished directly, without isolating the aldehyde, by treating the crude reaction material appropriately. Thus, by the addition of ethylene glycol, with an acid catalyst, for example $H_2SO_4$, p-toluene sulfonic acid, benzene sulfonic acid, phosphoric acid, etc., conversion of the phenylacetaldehyde to phenylacetaldehyde ethylene glycol acetal may be achieved. Alternatively, with methanol as an additive to the crude reaction mixture in the presence of such an acid catalyst, the dimethylacetal of phenylacetaldehyde may be obtained.

The following specific examples of the practice of the present invention are offered for the purpose of illustration only and are not to be taken as limiting the scope of the invention.

EXAMPLE 1

A 50 microliter sample of styrene oxide is sealed in vacuo in a small (150 millimeter × 5 millimeter inside diameter) pyrex tube. The sealed tube of styrene oxide is heated at 300° C for 1 hour. Thereafter, chromatographic analysis is conducted on the contents of the tube. It is found that 30.0 weight percent of the tube's contents is the desired reaction product phenylacetaldehyde, with 46.8 weight percent of the contents being unreacted styrene oxide. The balance of the reaction products include 21.5 percent heavy organic materials, 0.8 percent toluene, 0.1 percent phenylacetylene, and 0.8 percent light unidentified materials. It is noted that in the foregoing example, the reaction proceeded primarily as a vapor phase reaction.

EXAMPLE 2

Example 1 is repeated except that the heating at 300° C is continued for two hours instead of one hour. Chromatographic analysis of the material after heating gives the following composition:

| | |
|---|---|
| Phenylacetaldehyde | 44.7% |
| Styrene oxide | 16.6% |
| Heavy unidentified organics | 34.7% |
| Toluene | 2.5% |
| Phenylacetylene | 0.3% |
| Light unidentified materials | 1.2% |

EXAMPLE 3

A stainless steel Parr stirred reactor is charged with 700 milliliters of toluene and 75 g. styrene oxide. The reactor is sealed and heated at 275±5° C for 3 hours with stirring. The product mixture is then shown by gas liquid chromatographic analysis to consist of (toluene excluded) phenylacetaldehyde containing only small amounts of impurities. Analysis of the resulting reaction mixture showed 85.4 percent weight phenylacetaldehyde with 1.6 percent unreacted styrene oxide being present. Unidentified reaction materials made up the balance of the components. The phenylacetaldehyde is isolated by flash distillation of solvent in vacuo followed by vacuum fractional distillation. The yield is 62 percent theoretical. It should be noted that, in this example, to obtain a totally styrene oxide free end product it is necessary that the reaction product be first treated with mineral acid to convert the styrene oxide to the glycol, which is separated with the aqueous phase in a typical liquid-liquid separation. Then the toluene-phenylacetaldehyde phase is subjected to the distillation procedure described in the above example to obtain substantially pure phenylacetaldehyde.

EXAMPLE 4

Example 3 is essentially repeated except that a reaction temperature of 250±5° C is employed for a period of 5 hours. Analysis of the end product confirms that the conversion of styrene oxide is substantially completed during such 5 hours.

EXAMPLE 5

A 2 liter Parr stirred reactor is charged with 700 ml benzene and 75 g. styrene oxide. The reactor is sealed and heated at 275±5° C for 2 hours with stirring. The product mixture is then shown by glc analysis to consist of (benzene excluded) 95 percent phenylacetaldehyde, with the balance consisting of minor impurities. Phenylacetaldehyde of substantial purity is isolated by flash distillation of solvent in vacuo followed by vacuum fractional distillation. The yield is 65 percent of theoretical.

EXAMPLE 6

Example 5 is repeated except that a reaction temperature of 300±5° C is employed. The time required to effect complete conversion of the styrene oxide is 20 minutes. The yield of phenylacetaldehyde is 67 percent of theoretical.

EXAMPLE 7

Liquid styrene oxide at 300° C is conducted through the tubular member in the heated shell of a conventional shell-tube reactor. In this flow process, a residence time for the styrene oxide of approximately 30 minutes is utilized. The shell side of the shell-tube reactor is maintained at a temperature of 300° C by conventional molten salt bath. The end product from the reactor is conducted to a vacuum distillation tower, and thereafter the bottoms product is conducted to a second tower, wherein fractional distillation is accomplished to obtain phenylacetaldehyde of a satisfactory commercial purity.

EXAMPLE 8

Example 7 is repeated except that a temperature of 340° C is utilized, together with a residence time of 3 minutes. The results are comparable to those obtained in Example 7.

EXAMPLE 9

The foregoing example is repeated except the styrene oxide is vaporized under vacuum conditions and flowed through the reactor tubing with a residence time of 5 minutes at 340° C. The tubing is filled with glass beads to cause adequate obstruction to provide the desired residence time. A vacuum pump is utilized at the exit end of the reactor to maintain a pressure of less than about 10 mm Hg. The reaction product is collected in a conventional knock-down type condenser and is subsequently purified by distillation as explained in the preceding example.

EXAMPLE 10

Example 6 is repeated except that a temperature of 325° C is utilized throughout the course of processing. The time of heating is approximately 6 minutes. The conversion approaches substantial completion and the yield is comparable to that obtained in Example 6.

EXAMPLE 11

The purpose of this example is to illustrate how acid treatment may be conducted in those instances where required. To 100 milliliters of crude reaction product, including the inert solvent (toluene, benzene, etc., as illustrated and discussed in detail earlier herein), are added 10 milliliters of 1 percent by weight aqueous sulfuric acid. It should be noted that this 100 milliliters solution is comparable in composition to that disclosed in Example 3 except it is somewhat larger in styrene oxide contaminant in the reaction product. The resulting mixture of the aqueous acid and organic solvent-crude product is stirred for 1 hour at room temperature and the phases are separated utilizing a conventional separatory funnel. Analysis shows the resulting organic phase to be free of styrene oxide. A comparison of the analysis of the crude product (excluding the toluene content) and the organic phase obtained from the separation is as follows:

|  | Crude of Product | Organic Phase From Separation |
|---|---|---|
| Lights | 2.4 | 3.2 |
| Styrene oxide | 11.0 | nil |
| Phenylacetaldehyde | 74.4 | 95.2 |
| Heavy's | 12.2 | 1.6 |

From the foregoing it can be seen that substantially all styrene oxide is eliminated by the acid treatment and separation.

EXAMPLE 12

A crude reaction mixture from the thermolysis of styrene oxide was subjected to reaction with ethylene glycol to produce the corresponding acetal without purifying the phenylacetaldehyde within such crude reaction mixture. The thermolysis reaction was in accordance with the procedure set forth in Example 3 above and the crude reaction mixture contained 89.4 percent by weight phenylacetaldehyde, 7.6 percent by weight heavy unidentified organics and 3.0 percent by weight light unidentified materials, excluding the solvent present (benzene). Two hundred fifty grams of the foregoing, with solvent present, was admixed in a 500 ml. flask with 62 grams of ethylene glycol and with 1.0 gram of p-toluene sulfonic acid as catalyst. The mixture was heated to reflux, with the benzene-$H_2O$ azeotrope refluxing overhead and the $H_2O$ being trapped from the azeotrope by condensing on separation from the benzene. Refluxing took place for 5 ½ hours and then the reaction mixture was cooled. The reaction mixture was neutralized with $NaHCO_3$, diluted with $H_2O$ and then the organic phase separated from the aqueous phase. Upon analysis the organic phase was found to contain, on a benzene free basis, 66 percent by weight of the acetal. The yield is almost 100 percent, based on the amount of aldehyde contained in the crude mixture.

It should be noted that many of the foregoing examples do not utilize a styrene oxide acid conversion step in purification. This step is needed only in instances where the thermolysis reaction of styrene oxide is not conducted to substantial completion, or where very minor amounts of styrene oxide cannot be tolerated as impurity in the phenylacetaldehyde end product. It is generally preferred to practice the invention under such conditions that the styrene oxide reaction goes to completion, thus making the acid conversion step unnecessary.

Liquid phase, as used herein, primarily refers to the styrene oxide and phenylacetaldehyde and does not exclude the possibility of the lighter components, including solvent, being in a vapor state.

It should be understood that various modifications will now be apparent to one skilled in the art upon reading this specification and it is intended to cover such modifications as are covered by the appended claims.

What is claimed is:

1. The process of thermolysis of styrene oxide comprising heating styrene oxide, without the utilization of a catalyst, at a temperature of between about 180° C and 450° C to obtain a reaction product comprising phenylacetaldehyde.

2. The process of claim 1, wherein said temperature is between about 250° C and 375° C.

3. The process of claim 1, wherein said styrene oxide exists as a substantially pure styrene oxide, without other components being present at the time it is first subjected to heat.

4. The process of claim 3, wherein said temperature is between about 250° C and 375° C.

5. The process of claim 1, wherein said styrene oxide is in liquid phase during heating and said temperature is between about 275° C and 350° C.

6. The process of claim 1, wherein said styrene oxide is substantially in vapor phase during heating, and said temperature is between 325° C and 375° C.

7. The process of claim 1 wherein said styrene oxide is present in solution with an inert solvent at the time it is first subjected to heating.

8. The process of claim 7 wherein the temperature is between about 250° C and 375° C.

9. The process of claim 7 wherein said styrene oxide in solution is in the liquid phase during heating.

10. The process of claim 9 wherein the temperature is between about 275° C and 350° C.

11. The process of claim 7 wherein said styrene oxide in solution is in the vapor phase during heating.

12. The process of claim 11 wherein said temperature is between about 325° C and 375° C.

13. The process of claim 1 wherein said process comprises heating said styrene oxide a sufficient period of time to carry the reaction of styrene oxide substantially to completion.

14. The process of claim 13 wherein said heating of styrene oxide is carried out in solution in an inert solvent, and wherein said reaction product is subjected to distillation to produce purified phenylacetaldehyde.

15. The process of claim 1 further comprising the steps of treating said reaction product with dilute mineral acid.

16. The process of claim 15, comprising the subsequent steps of separating the aqueous phase and distilling the organic phase to provide a purified phenylacetaldehyde product.

17. The process of claim 14 wherein the steps are conducted as a continuous process.

18. The process of claim 1 further comprising the step of adding ethylene glycol and an acid catalyst to the crude reaction product and reacting the resulting mixture to obtain phenylacetaldehyde ethylene glycol acetal.

19. The process of claim 18 in which said catalyst is p-toluene sulfonic acid.

20. The process of claim 1 further comprising the step of adding methanol and an acid catalyst to the crude reaction product and reacting the resulting mixture to obtain phenylacetaldehyde dimethylacetal.

21. The process of claim 20 in which said acid catalyst is p-toluene sulfonic acid.

22. The process of manufacturing phenylacetaldehyde comprising heating styrene oxide, without utilizing a catalyst, for a finite time interval at a temperature such that the reaction product obtained, excluding any inert components and diluents present, contains at least about 30 percent phenylacetaldehyde by weight.

* * * * *